Sept. 10, 1957  R. E. DUNCKLEE ET AL  2,806,074
GRAIN HOPPER
Filed Aug. 9, 1955
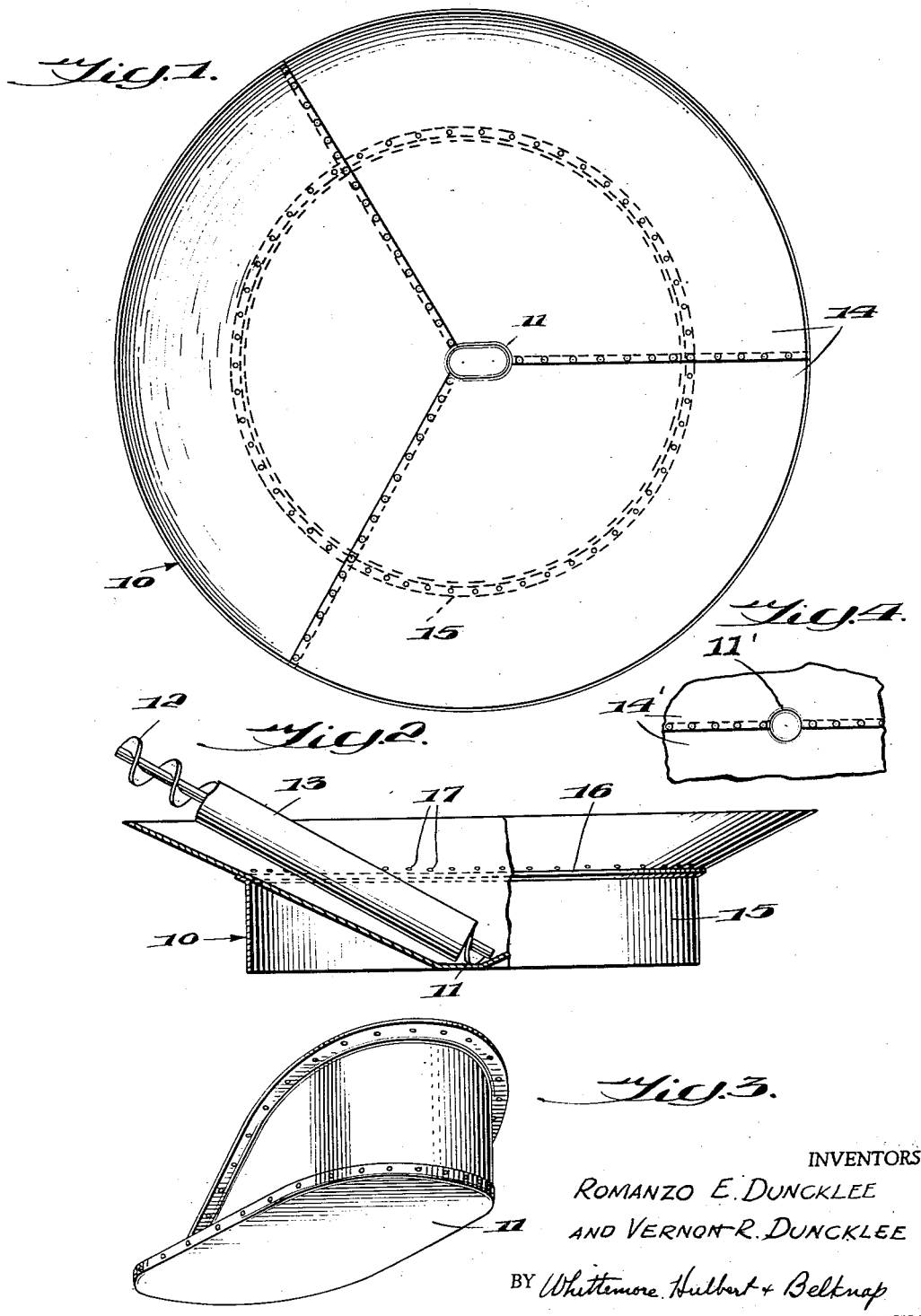
INVENTORS
ROMANZO E. DUNCKLEE
AND VERNON R. DUNCKLEE
BY Whittemore, Hulbert + Belknap
ATTORNEYS

United States Patent Office 2,806,074
Patented Sept. 10, 1957

---

2,806,074

GRAIN HOPPER

Romanzo E. Duncklee and Vernon R. Duncklee, Emerado, N. Dak.

Application August 9, 1955, Serial No. 527,368

2 Claims. (Cl. 220—1)

The present invention relates to a grain hopper, and more particularly to a hopper into which grain is to be deposited from a grain box and from which it is transferred to a grain bin.

It is one of the objects of the invention to provide an inverted conical hopper having a generally circular perimeter to facilitate transfer of grain from a truck, regardless of the position of the truck with respect to the hopper.

It is a further object of the invention to provide a hopper having a relatively wide open top and having its sides sloping toward the bottom thereof so that substantially all of the grain deposited therein may be removed by a conventional grain auger.

It is still another object of the invention so to construct the hopper that its height is held to minimum to permit transfer of grain directly from a truck body positioned adjacent thereto, yet having sufficient cubic capacity to hold a substantial amount of grain.

Another object is to provide a supporting base for the conical hopper, the base being so attached to the hopper that the latter will normally hold a load of grain without tipping over, but which adds little or no height to the hopper.

Other objects will be apparent from the following description of the invention when taken with the accompanying drawings in which:

Fig. 1 is a plan view of one embodiment of the hopper;

Fig. 2 is an elevation of the hopper showing a grain auger or screw conveyor associated therewith;

Fig. 3 is a perspective view of the bottom section; and

Fig. 4 is a fragmentary plan view of a modified form of hopper.

In Figs. 1 and 2 of the drawings it will be seen that the hopper 10 is generally conical in shape with a wide open mouth. The side walls of the hopper slope toward a flat bottom 11 so that grain deposited in the hopper will flow by gravity to the bottom. The auger 12, rotatably mounted in conveyor tube 13, transfers the grain from the hopper to a grain bin which might be located some distance from the hopper and at some height above the ground. The perimeter of the open or top end of the hopper is generally circular. The purpose of this is to permit a truck to be backed up to any side of the hopper with the discharge gate of the truck disposed directly over the hopper so that, regardless of the angle of the truck with respect to the hopper, grain may readily be discharged through the gate into the hopper. It is to be noted that the flat bottom is either oval, as shown at 11 in Fig. 1, or circular, as indicated at 11′ in Fig. 4. It will also be seen that the sides of the hopper may be assembled from three separate sections 14, as shown in Fig. 1, or two sections, as indicated at 14′ in Fig. 4. These sections are joined by spot welding to provide an integral structure.

The supporting base for the hopper is indicated at 15 and is circular in form. The axis of the base preferably coincides with that of the hopper. The upper edge of the base is flared at 16, the angle of the flare corresponding to that of the hopper sides. The flared portion of the base is spot welded to the hopper, as at 17, to form a strong connection therewith. It will be seen from Fig. 2 that the dimensions of the base are such that its bottom edge lies in substantially the same plane as the flat bottom 11 of the hopper and is parallel to the top edge of the hopper. Thus, while forming a firm support for the hopper, the base adds no height thereto. At the same time when the base rests on the ground the top edge of the hopper is parallel to the ground.

When it is desired to transfer grain which has been gathered in the field and deposited in a grain box on a truck, the loaded truck is backed up to the hopper which rests on the ground. A discharge gate on the truck is then opened to permit the grain to flow by gravity into the hopper. At the same time the auger 12 is operated to convey grain deposited in the hopper through tube 13 to a grain bin or the like.

The hopper and its base are fabricated from relatively light weight sheet metal such as 22-gauge galvanized sheet. The diameter of the hopper mouth is approximately four feet and its height about ten inches. The area of the flat bottom may be from four square inches to eight square inches, or less than one two-hundredths of that of the hopper mouth. It will thus be appreciated that, because of its weight and dimensions, it is readily portable and inexpensive to manufacture.

While preferred forms of the invention have been described and illustrated, it is intended that such modifications as fall within the terms of the appended claims be utilized. The number of sections, and the dimensions, for instance, may be changed to meet individual requirements. Also the invention is not necessarily limited to the means for securing the parts to each other as shown in the drawings.

What is claimed is:

1. A portable hopper of the class described comprising a conical receptacle having at its top a horizontally open wide mouth and at its lower extremity a closed flat bottom, said bottom being parallel to the edge of said mouth and having an area substantially smaller than that of the mouth, the inclined sides of said hopper being joined to said bottom, and a cylindrical supporting base having at its uppermost edge a flared flange secured to the under side of said hopper intermediate the top and bottom of the hopper, the lowermost edge of said base and said top edge being disposed in parallel planes.

2. A hopper as defined in claim 1 in which said flat bottom and said lower edge are disposed in substantially the same plane and in which the axes of said receptacle and said base are coincident.

References Cited in the file of this patent

UNITED STATES PATENTS

| 1,218,449 | Nickum | Mar. 6, 1917 |
| 2,247,608 | De Groff | July 1, 1941 |
| 2,489,766 | Ernestus et al. | Nov. 29, 1949 |
| 2,551,216 | Martin | May 1, 1951 |